(12) United States Patent
Kling et al.

(10) Patent No.: US 9,971,910 B2
(45) Date of Patent: May 15, 2018

(54) MULTI-LEVEL SECURITY DOMAIN SEPARATION USING SOFT-CORE PROCESSOR EMBEDDED IN AN FPGA

(71) Applicant: RAYTHEON COMPANY, Waltham, MA (US)

(72) Inventors: Matthew T. Kling, Marlborough, MA (US); Clark B. Hockenbury, Marlborough, MA (US); Jerrold L. Bonn, Marlborough, MA (US); Susan F. Bataller, Marlborough, MA (US); Mark Veneziano, Marlborough, MA (US)

(73) Assignee: RAYTHEON COMPANY, Waltham, MA (US)

( * ) Notice: Subject to any disclaimer, the term of this patent is extended or adjusted under 35 U.S.C. 154(b) by 405 days.

(21) Appl. No.: 14/603,215

(22) Filed: Jan. 22, 2015

(65) Prior Publication Data
US 2016/0335459 A1  Nov. 17, 2016

(51) Int. Cl.
G06F 21/76 (2013.01)
G06F 21/74 (2013.01)
G06F 21/60 (2013.01)

(52) U.S. Cl.
CPC ............ *G06F 21/76* (2013.01); *G06F 21/606* (2013.01); *G06F 21/74* (2013.01); *G06F 2221/2113* (2013.01)

(58) Field of Classification Search
CPC ........ G06F 21/76; G06F 21/606; G06F 21/74; G06F 2221/2113
See application file for complete search history.

(56) References Cited

U.S. PATENT DOCUMENTS 6,298,370 B1 * 10/2001 Tang ..................... G06F 9/5044
                                                 718/100
6,326,758 B1 * 12/2001 Discenzo ........... G05B 23/0243
                                                 318/432

(Continued)

OTHER PUBLICATIONS

A. S. Zeineddini and K. Gaj, "Secure partial reconfiguration of FPGAs," Proceedings. 2005 IEEE International Conference on Field-Programmable Technology, 2005., Singapore, 2005, pp. 155-162.*

(Continued)

*Primary Examiner* — Abu Sholeman
(74) *Attorney, Agent, or Firm* — Lewis Roca Rothgerber Christie LLP (57) ABSTRACT

A system and method for operating multiple security domains on one circuit card assembly, using a field-programmable gate array (FPGA) with an embedded security domain separation gate providing the MAC between multiple soft-core CPUs also embedded in the FPGA. In one embodiment, the FPGA is segregated into two or more security domains with no data paths between soft-core CPUs in each security domain except through the security domain separation gate. The security domain separation gate applies rules to any information to be transmitted between the security domains to avoid transmission of malicious content and to avoid transmission of information of a certain classification level or type to a security domain at a lower classification level or type.

14 Claims, 3 Drawing Sheets

(56) References Cited

U.S. PATENT DOCUMENTS

| | | | |
|---|---|---|---|
| 7,222,114 B1* | 5/2007 | Chan | G06N 5/025 706/14 |
| 7,389,413 B2* | 6/2008 | Bandini | G06Q 10/107 380/259 |
| 7,509,434 B1* | 3/2009 | Crosmer | H04L 63/105 709/223 |
| 8,078,707 B1* | 12/2011 | Watsen | H04L 41/28 709/223 |
| 8,434,044 B1* | 4/2013 | Goldman | G06F 17/5072 710/305 |
| 8,584,211 B1* | 11/2013 | Vetter | G06F 21/00 707/786 |
| 8,627,079 B2* | 1/2014 | Cizas | G06F 21/76 713/169 |
| 8,694,659 B1* | 4/2014 | Stahl | H04L 61/6009 380/200 |
| 8,739,270 B1 | 5/2014 | Arnold | |
| 8,745,385 B2 | 6/2014 | Goding et al. | |
| 9,294,097 B1* | 3/2016 | Vassiliev | H03K 19/17704 |
| 2004/0025016 A1* | 2/2004 | Focke | G06F 9/45537 713/164 |
| 2006/0020907 A1* | 1/2006 | Tonami | G06F 21/76 717/100 |
| 2006/0282886 A1* | 12/2006 | Gaug | H04L 63/20 726/5 |
| 2010/0077472 A1 | 3/2010 | Kaabouch et al. | |
| 2010/0223270 A1* | 9/2010 | McAllister | G06F 17/27 707/754 |
| 2011/0219424 A1* | 9/2011 | Panasyuk | G06F 21/606 726/1 |
| 2012/0066509 A1* | 3/2012 | Lapp | G06F 21/606 713/189 |
| 2014/0059692 A1* | 2/2014 | Dapp | G06F 21/606 726/26 |
| 2015/0135254 A1* | 5/2015 | Thilenius | H04L 63/02 726/1 |
| 2017/0180253 A1* | 6/2017 | Koren | H04L 45/7453 |

OTHER PUBLICATIONS

McLean, Mark et al., "FPGA-Based Single Chip Cryptographic Solution (U)," Military Embedded Systems, Mar. 2007, pp. 34-37, OpenSystems Publishing, Saint Clair Shores, Michigan, USA.*

Raytheon Company, "Trusted Gateway System™", 4 pages, 2014.

Written Opinion of the International Searching Authority for International Application No. PCT/US2015/061415 filed Nov. 18, 2015, Written Opinion of the International Searching Authority dated Feb. 9, 2015 (5 pgs.)

International Search Report for International Application No. PCT/US2015/061415, filed Nov. 18, 2015, International Search Report dated Feb. 1, 2016 and dated Feb. 9, 2016 (4 pgs.)

* cited by examiner

MULTI-LEVEL SECURITY DOMAIN SEPARATION USING SOFT-CORE PROCESSOR EMBEDDED IN AN FPGA

STATEMENT REGARDING FEDERALLY SPONSORED RESEARCH OR DEVELOPMENT

This invention was made with U.S. Government support under contract No. Withheld, awarded by the Department of Defense. The U.S. Government has certain rights in this invention.

BACKGROUND

1. Field

One or more aspects of embodiments according to the present invention relate to processing information of different classification levels, where Mandatory Access Control (MAC) is required to restrict data from exposure to unauthorized security domains, and more particularly to a system and method for processing data of different classification levels. MAC applies to information where each piece of information is associated with a classification level, and system users are not allowed to change the association of data with classification levels or the access policy of domains to classification levels. This is in contrast with Discretionary Access Control (DAC) where a user can change the authorization of a user to a piece of information. Examples of classifications and security domains are databases of different company departments (order processing, engineering, finance) or DoD classification levels (top-secret, secret, unclassified).

2. Description of Related Art

In systems processing information from different security domains, communication between components handling data in one domain and components handling data in a different domain may be controlled to avoid the transmission of data to where it may be accessible to persons who should not have access to it. Furthermore, it may be necessary to restrict data flow between domains to prevent the transfer of malicious code or covert channel information. In systems in which separate computers, for example, are used to keep the security domains separate, a component referred to as a "data diode" may be used in a communication link between the computers to allow data to flow only in one direction in order to enforce mandatory read or write access control. Approaches such as these are expensive and lack compactness (for use in systems using embedded hardware and software).

Thus, there is a need for an improved system and method of processing data of different classification levels.

SUMMARY

Aspects of embodiments of the present disclosure are directed toward a system and method for operating multiple security domains on one circuit card assembly, using a field-programmable gate array (FPGA) with an embedded security domain separation gate providing the MAC between multiple soft-core CPUs also embedded in the FPGA. In one embodiment, the FPGA is segregated into two or more security domains with no data paths between soft-core CPUs in each security domain except through the security domain separation gate. The security domain separation gate applies rules to any information to be transmitted between the security domains to avoid transmission of malicious content and to avoid transmission of information of a certain classification level to a security domain at a lower classification level. Use of soft-core CPUs in a single FPGA to handle information in each security domain provides the cost effectiveness, flexibility, adaptability and compactness lacking from related art by introducing a single chip security domain separation and processing option.

According to an embodiment of the present invention, there is provided a system for performing operations on data in two different security domains, the system including a field-programmable gate array (FPGA), the FPGA including: a first security domain having a first classification level, the first security domain including: first processing circuitry and a first soft-core processor, and a second security domain having a second classification level, the second security domain including: second processing circuitry and a second soft-core processor, and one or more security domain separation gates connected to the first security domain and to the second security domain, the one or more security domain separation gates configured: to receive first data from the first security domain and transmit the first data to the second security domain when the first data complies with a first set of rules, and to receive second data from the second security domain and transmit the second data to the first security domain when the second data complies with a second set of rules, the only data paths between the first security domain and the second security domain being through the security domain separation gates.

In one embodiment, the first security domain and the second security domain are physically disconnected except for data paths through the security domain separation gates.

In one embodiment, the second classification level is a higher classification level than the first classification level.

In one embodiment, the first set of rules permits unrestricted flow of information.

In one embodiment, the first set of rules requires that information transmitted from the first security domain to the second security domain be structured in messages complying with a format specified in a message dictionary.

In one embodiment, the second set of rules prohibits the transmission of information from the second security domain to the first security domain.

In one embodiment, the second set of rules requires that information transmitted from the first security domain to the second security domain be free of suspect words and phrases, the suspect words and phrases being stored in a rules file.

In one embodiment, the system includes a first external processor external to the FPGA, the first external processor having a classification level being the same as the first classification level.

In one embodiment, the system includes a first memory device and a second memory device, the first memory device having a classification level being the same as the first classification level, the second memory device having a classification level being the same as the second classification level, each of the first memory device and the second memory device including an address bus and a data bus, wherein the address bus and the data bus of the first memory device are connected only to the first security domain of the FPGA and to the first external processor, and the address bus and the data bus of the second memory device are connected only to the second security domain of the FPGA.

In one embodiment, the system includes a memory arbiter in the first security domain of the FPGA, wherein the address bus and the data bus of the first memory device are connected to the memory arbiter.

According to an embodiment of the present invention, there is provided a method for controlling data flow between two security domains in a system, the system including a field-programmable gate array (FPGA), the FPGA including: a first security domain having a first classification level, the first security domain including: first processing circuitry and a first soft-core processor, and a second security domain having a second classification level, the second security domain including: second processing circuitry and a second soft-core processor, and one or more security domain separation gates connected to the first security domain and to the second security domain, the one or more security domain separation gates configured: to receive first data from the first security domain and transmit the first data to the second security domain when the first data complies with a first set of rules, and to receive second data from the second security domain and transmit the second data to the first security domain when the second data complies with a second set of rules, the only communication paths between the first security domain and the second security domain being through the security domain separation gates, the method including: receiving, by a security domain separation gate of the one or more security domain separation gates, data from the first security domain for transmission to the second security domain, applying a first set of rules to the data, and transmitting the data to the second security domain when the data comply with the rules.

In one embodiment, the first classification level is a higher classification level than the second classification level, and the first set of rules prohibits the transmission of data.

In one embodiment, the second classification level is a higher classification level than the first classification level, and the first set of rules allows unrestricted transmission of data.

In one embodiment, the second classification level is a higher classification level than the first classification level, and the first set of rules allows transmission only of data structured in messages and complying with a format specified in a message dictionary.

In one embodiment, the first classification level is a higher classification level than the second classification level, and the first set of rules allows transmission of data only when information to be transmitted from the first security domain to the second security domain is free of suspect words and phrases stored in a rules file.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for multi-level security domain separation using soft-core processors embedded in an FPGA provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

As used herein, when a first element in a circuit is referred to as being "physically disconnected" from a second element, there is an absence of conductive paths to carry data between the two elements, and there are no processor-controlled switches that could, if turned on, establish such paths. An element may be referred to as being "physically disconnected" from a second element even though shared conductors (not configured to carry data) supply power to both elements or re-programming of a field-programmable gate array (FPGA) may be capable of establishing a data path between them.

In systems that process information spanning different security domains (e.g., security domains having different classification levels), a related art high-assurance guard (HAG) may be used between computer systems handling data from different security domains; the HAG is a dedicated device that manages the flow of traffic in both directions and ensures that data restricted to a single domain cannot cross to another and be inadvertently disclosed. In some instances it may be required for a single circuit card assembly (CCA) to process information in multiple security domains simultaneously. For example, a circuit card assembly used to process classified telephone calls may process the voice data of the telephone calls in a top-secret security domain and status and control data in a secret security domain, and it may be necessary to pass control commands, e.g., ringup, hangup, from the secret security domain to the top-secret security domain, and status data, e.g., phone busy, from the top-secret security domain to the secret security domain. Embodiments of the present invention provide an extremely effective approach for implementing security domain separation through the use of soft-core processors embedded within a field-programmable gate array (FPGA) along with an FPGA security domain separation gate function as well as other design features embedded within the same FPGA. The soft-core processors implement security domain specific processing in different execution spaces while the FPGA guarantees separation through the use of controlled interfaces including a security domain separation gate to enforce MAC and ensure only allowed information can pass between domains.

Figure 1:
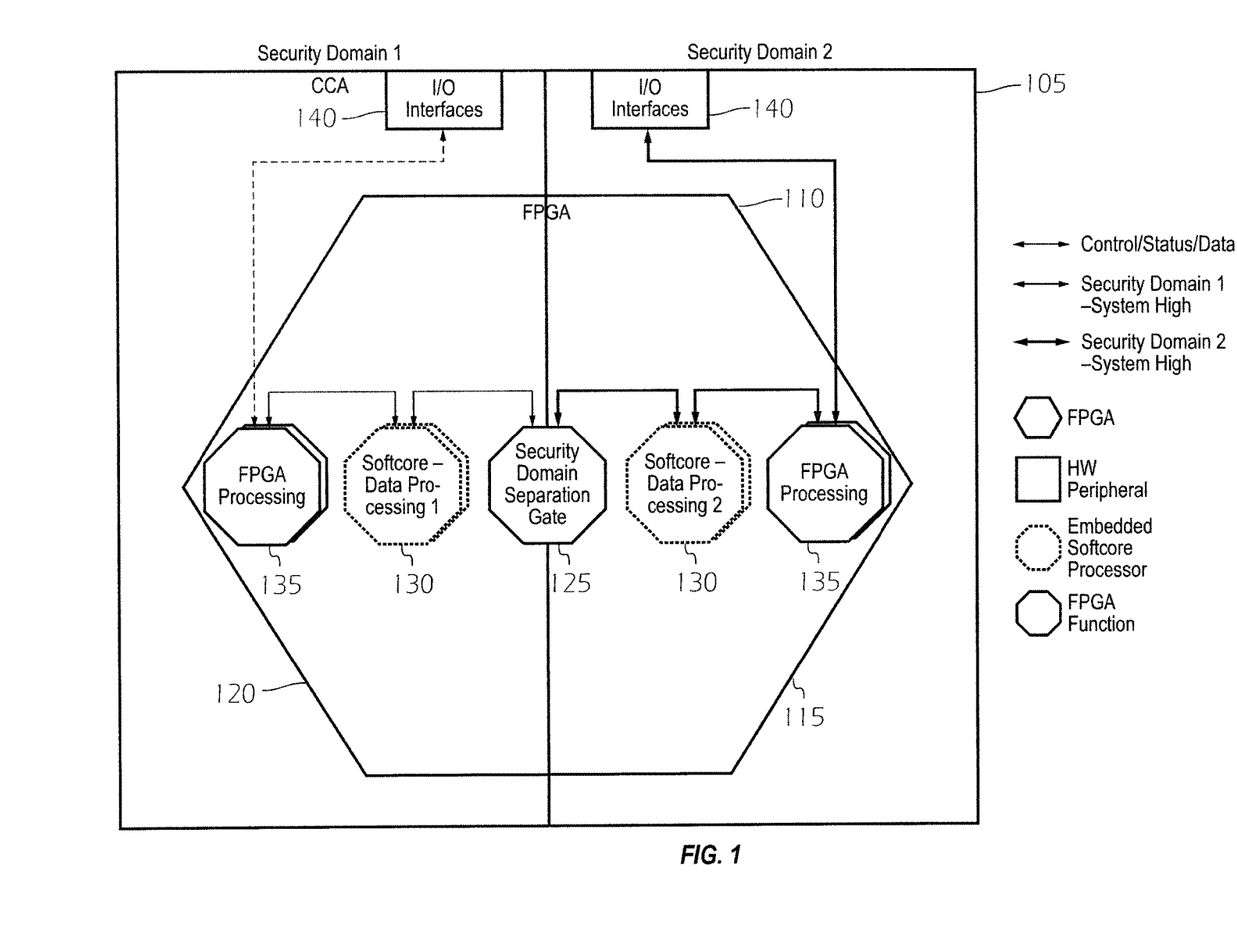
FIG. 1 is a block diagram of a multi-level security system according to an embodiment of the present invention.

Referring to FIG. 1, in one embodiment, multi-level security domain separation is implemented on a single circuit card assembly 105 through the use of an FPGA 110 with multiple soft-core processors 130 embedded inside it. The FPGA 110 includes two security domains, e.g., a secret security domain 115 and a top-secret security domain 120, and separates the two security domains using a security domain separation gate 125; in one embodiment, this function is part of the overall FPGA design and is not implemented in software. Thus, the security domain separation gate 125 is less vulnerable to an attack in which an attacker may substitute malicious software for the software that ordinarily would execute in the system. An FPGA 110 also may have other provisions for enhancing the security of the system, such as including directional data paths in the security domain separation gate 125. In general, a security domain separation gate may include multiple data paths, e.g., one or more paths from the secret security domain 115 to the top-secret security domain 120, and one or more paths from the top-secret security domain 120 to the secret security domain 115. Each path may implement a separate set of rules. A directional data path may be established by connecting an output on a first side of the boundary between the security domains to an input on a second side of the boundary, thereby allowing data to flow in that path only from the first side to the second side of the boundary.

The security domain separation gate 125 prevents information of the higher classification level from being transmitted into the lower-level security domain. For example, if the FPGA 110 includes two security domains, e.g., a secret security domain 115 and a top-secret security domain 120, then the security domain separation gate 125 may allow information to flow without restriction from the secret security domain 115 to the top-secret security domain 120, but it may permit information to flow from the top-secret security domain 120 to the secret security domain 115 only when the information complies with certain rules. In one embodiment, the rules prohibit any flow of information from the top-secret security domain 120 to the secret security domain 115 and allow unrestricted flow of information from the secret security domain 115 to the top-secret security domain 120; in such an embodiment, the security domain separation gate 125 acts as a data diode. In another embodiment, the rules specify that the information to be transmitted from the top-secret security domain 120 to the secret security domain 115 may contain only messages that satisfy a pre-defined set of conditions. The rules are pre-built and stored in a file (i.e., generated before the system starts operating) and loaded into the FPGA 110 at runtime. The FPGA 110 reads the rules file in order to determine the parameters that allow the security domain separation gate to determine if messages are allowed to cross domains. In operation, the security domain separation gate 125 performs a rules check on all messages queued for transmission between the two domains (e.g., messages placed in a buffer by a soft-core processor or processing circuitry in one domain, for transmission to another domain via the security domain separation gate 125), to ensure that only allowed data can pass between the two domains. Data being passed from a security domain with a higher classification level to a security domain with a lower classification level is "downgraded", or checked to make sure that it does not contain any information not at the lower classification level. In one embodiment, messages queued for transmission from the domain with a lower classification level to the domain with a higher classification level are checked by the security domain separation gate 125 to verify that they comply with the rules, to reduce the risk that a message may contain malicious code or provide a return path for a covert channel. In one embodiment, the security domain separation gate performs a "dirty words" or "suspect words and phrases" check. In this embodiment, the security domain separation gate checks each text message queued for transmission from one security domain to another for words or phrases in a list of words and phrases indicating a likelihood that that Message contains information of a certain classification level, and transmits the message only if the classification level is the same as or lower than that of the destination domain. The list of words and phrases may be part of the rules file.

As used herein, a processor is a circuit that reads instructions from memory external to the processor and executes the instructions, and a soft-core processor 130 is a processor constructed from basic elements in the FPGA 110 by programming the connections in the FPGA 110. Thus a processor is distinct from another functional block that may be implemented in the FPGA 110 with registers and logic, which may process data without the use of instructions stored in, and read from, memory outside the functional block. Such other functional blocks may be referred to herein as FPGA processing 135 or "processing circuitry".

Each domain within the FPGA 110 may contain one or more soft-core processors 130 running software required for data processing in that domain. Each soft-core processor 130 implements processing required for the domain in which it is executing, and this processing may be separated into multiple soft-core processors 130 within a single FPGA 110 depending on the implementation needs. A soft-core processor 130 may implement software running on top of a real-time operating system (RTOS) or on "bare-metal" (i.e., without an RTOS). Each soft-core processor 130 is wired only to resources in the same security domain; this wiring is enforced by the FPGA design. For example, a soft-core processor 130 in a top-secret domain is not wired within the FPGA 110 to a data or address bus in a secret domain in the FPGA 110. This is illustrated in FIG. 1 by the absence of direct connections between the secret security domain 115 and the top-secret security domain 120, the only communication path between the two domains being through the security domain separation gate 125. The circuit card assembly 105 may have one or more input/output (I/O) interfaces 140 in each security domain.

In one embodiment, several security domain separation gates 125 provide parallel communication paths between two security domains in the FPGA 110, and an FPGA 110 may contain more than two security domains. For example, an FPGA 110 may contain three security domains: a first, unclassified security domain; a second, secret security domain; and a third, top-secret security domain. There may be a single security domain separation gate 125 between the first security domain and the second security domain, three domain separation gates between the second security domain and the third security domain, and two domain separation gates between the first security domain and the third security domain.

Figure 2:
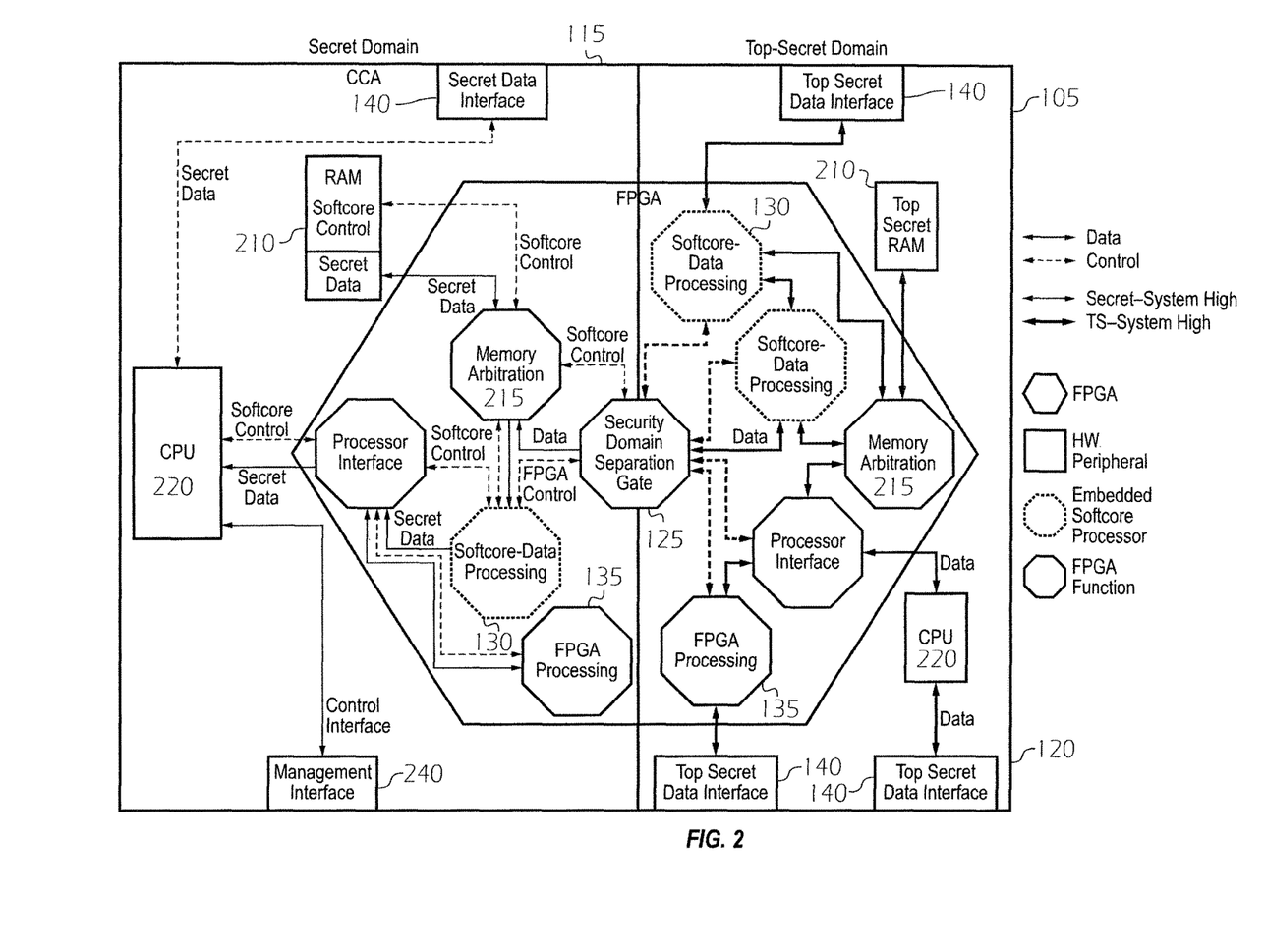
FIG. 2 is a block diagram of a multi-level security system according to another embodiment of the present invention.

Referring to FIG. 2, each domain may also contain a volatile or non-volatile memory device 210 dedicated to that domain for storing data; the FPGA 110 physically restricts access to these memory devices 210 to only the FPGA function or soft-core processors 130 that are in the same security domain, e.g., data or address busses are not provided connecting a processor in one security domain to memory dedicated to another security domain. In other embodiments, one or more memory arbiters 215 may control access to the memory. In one example, a memory device 210 is entirely within a single security domain but is separated into different regions each with its own access rights, each region corresponding, for example, to a process executing in that security domain. Access to only a certain respective region of the device by each process is enforced by the memory arbiter 215 within that security domain of the FPGA 110. A memory device 210 may store soft-core control data which may be passed to a soft-core processor 130 in the same security domain, or passed through the security domain separation gate to other soft-core processors. Control data may include, for example, data for setting up communications channels, e.g., Internet Protocol (IP) addresses, or configuration parameters, such as data rates or flow control information.

In another embodiment, a memory device 210 may be shared between security domains and a memory arbiter, which instead of being entirely within a single security domain (as shown in FIG. 2) straddles the boundary between security domains. This memory arbiter may allow access to a first region of memory only by processors in a first security domain of the FPGA 110, and it may allow access to a second region of memory only by processors in a second security domain of the FPGA 110, where the first region of memory and the second region of memory do not overlap. In another embodiment, a memory arbiter is connected to a memory device which contains two non-overlapping regions of memory, a first region in the first security domain and a second region in the second security domain. The memory arbiter has processor-side busses connected to the first security domain and to the second security domain, respectively, and memory-side busses connected to the memory device. The memory arbiter may have, for example, a first processor-side address bus and a first processor-side data bus, both connected to the first security domain, and a second processor-side address bus and a second processor-side data bus, both connected to the second security domain, and a memory-side address bus and a memory-side data bus, both connected to the memory device. The memory arbiter then provides access, for memory access requests received through the first processor-side address bus and the first processor-side data bus, only to the first region of memory, and, for memory access requests received through the second processor-side address bus and the second processor-side data bus, only to the second region of memory.

Each security domain may extend outside of the FPGA 110, i.e., devices such as processors, within the security domain, may be present external to the FPGA 110. These devices may be in direct communication with FPGA elements in the same security domain, and in communication with FPGA elements in other security domains through one or more security domain separation gates 125. For example, FIG. 2 shows external processors (CPUs) 220 operating in both security domains 115, 120. A processor interface may be included in the FPGA for each external CPU. Input/output (I/O) interfaces or "data interfaces" at the card edge may be dedicated to a specific domain and not accessed across domains. As shown in FIG. 2, the FPGA 110 may contain additional functional blocks which may be soft-core processors 130 or processing circuitry 135, and the CCA 105 may contain, e.g., a management interface 240 for control and status information.

Figure 3:
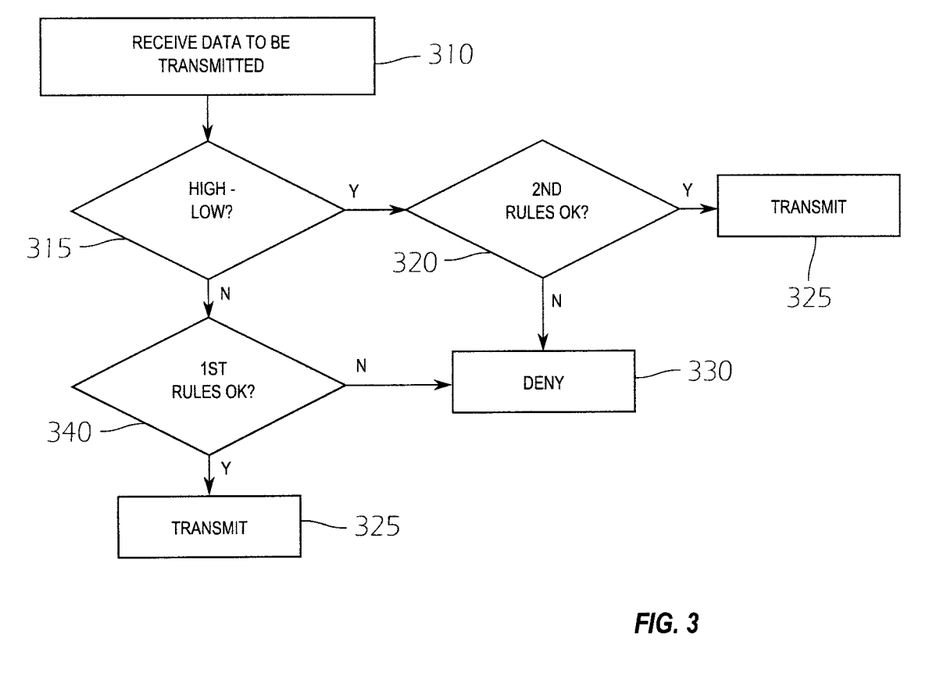
FIG. 3 is a flowchart of a method for transmitting data from one security domain to another according to an embodiment of the present invention.

In one embodiment, a security domain separation gate is implemented in a soft-core processor. FIG. 3 summarizes a decision method that may be employed in such an embodiment to determine whether to transmit information from one security domain to another. In a first step 310, the information to be transmitted is received by the security domain separation gate 125. In a second step 315, a determination is made whether the requested transmission is from a security domain with a higher classification level to a security domain with a lower classification level. If it is, then, in a step 320, a determination is made whether the information to be transmitted complies with a second set of rules, and, if it does, the information is transmitted in a step 325; otherwise the transmission is denied, in a step 330. If the requested transmission is not from a security domain with a higher classification level to a security domain with a lower classification level, then, in a step 340, a determination is made whether the information to be transmitted complies with a first set of rules, and, if it does, the information is transmitted in a step 325; otherwise the transmission is denied, in a step 330.

As used herein, a "security domain" is a collection of data processing and data storage hardware, the flow of information into and/or out of which is controlled to prevent unacceptable commingling of information of different classification levels. Although exemplary embodiments described herein refer to classification levels, "secret" information, "top-secret" information, and the like, the use of embodiments of the present invention is not limited to military or defense applications. For example, embodiments of the present invention may be used in a civilian business context, in which it may be desired to segregate, for example, financial information from engineering information, and information in the two categories may be kept in different security domains. As such, it will be understood that, as used herein, a "classification level" refers to the classification of information into categories for the purpose of segregation, and is not limited to classifications such as "secret" and "top-secret." Moreover, some embodiments of the present invention may be suitable for use in systems in which the classification levels are not ranked, i.e., in which one of two different classification levels is neither a higher classification level nor a lower classification level than the other of the two classification levels. An example of such a system may be the above-mentioned business application, in which it may be advantageous to keep certain engineering information out of the finance security domain, and it may also be advantageous to keep certain financial information out of the engineering security domain.

As used herein, "data" is synonymous with "information" and the term "data" may include both information used to convey messages or other content, as well as control information including commands used, for example, to configure communication channels. It will be understood that, although the terms "first", "second", "third", etc., may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed herein could be termed a second element, component, region, or section, without departing from the spirit and scope of the inventive concept.

The terminology used herein is for the purpose of describing particular embodiments only and is not intended to be limiting of the inventive concept. As used herein, "substantially", "about", and similar terms are used as terms of approximation and not as terms of degree, and are intended to account for the inherent deviations in measured or calculated values that would be recognized by those of ordinary skill in the art. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of present invention." Also, the term "exemplary" is intended to refer to an example or illustration.

It will be understood that when an element is referred to as being "connected to" or "coupled to" another element, it may be directly connected to, or coupled to, the other element, or one or more intervening elements may be present. In contrast, when an element or layer is referred to as being "directly connected to", or "directly coupled to", another element or layer, there are no intervening elements or layers present.

Although limited embodiments of a system and method for multi-level security domain separation using soft-core processors embedded in an FPGA have been specifically described and illustrated herein, many modifications and variations will be apparent to those skilled in the art. Accordingly, it is to be understood that a system and method for multi-level security domain separation using soft-core processors embedded in an FPGA employed according to principles of this invention may be embodied other than as specifically described herein. The invention is also defined in the following claims, and equivalents thereof.

What is claimed is:

1. A system for performing operations on data in two different security domains,
   the system comprising a field-programmable gate array (FPGA),
   the FPGA comprising:
      a first security domain having a first classification level, the first security domain comprising:
         first processing circuitry and
         a first soft-core processor, and
      a second security domain having a second classification level, the second security domain comprising:
         second processing circuitry and
         a second soft-core processor, and
      one or more security domain separation gates connected to the first security domain and to the second security domain, the one or more security domain separation gates configured:
         to receive first data from the first security domain and transmit the first data to the second security domain if the first data complies, during operation, with a first set of rules, and
         to receive second data from the second security domain and transmit the second data to the first security domain if the second data complies, during operation, with a second set of rules,
      the only data paths between the first security domain and the second security domain being through the one or more security domain separation gates, and
      the second set of rules requiring that information to be transmitted from the first security domain to the second security domain be free of words and phrases indicating a likelihood that the information to be transmitted contains information of the second classification level.

2. The system of claim 1, wherein the first security domain and the second security domain are physically disconnected except for data paths through the security domain separation gates.

3. The system of claim 1, wherein the second classification level is a higher classification level than the first classification level.

4. The system of claim 3, wherein the first set of rules permits unrestricted flow of information.

5. The system of claim 3, wherein the first set of rules requires that information transmitted from the first security domain to the second security domain be structured in messages complying with a format specified in a message dictionary.

6. The system of claim 3, wherein the second set of rules prohibits the transmission of information from the second security domain to the first security domain.

7. The system of claim 1, further comprising a first external processor external to the FPGA, the first external processor having a classification level being the same as the first classification level.

8. The system of claim 7, further comprising a first memory device and a second memory device,
   the first memory device having a classification level being the same as the first classification level,
   the second memory device having a classification level being the same as the second classification level,
   each of the first memory device and the second memory device comprising an address bus and a data bus,
   wherein the address bus and the data bus of the first memory device are connected only to the first security domain of the FPGA and to the first external processor, and
   the address bus and the data bus of the second memory device are connected only to the second security domain of the FPGA.

9. The system of claim 8, further comprising a memory arbiter in the first security domain of the FPGA, wherein the address bus and the data bus of the first memory device are connected to the memory arbiter.

10. A method for controlling data flow between two security domains in a system, the system comprising a field-programmable gate array (FPGA),
    the FPGA comprising:
       a first security domain having a first classification level, the first security domain comprising:
          first processing circuitry and
          a first soft-core processor, and
       a second security domain having a second classification level, the second security domain comprising:
          second processing circuitry and
          a second soft-core processor, and
       one or more security domain separation gates connected to the first security domain and to the second security domain, the one or more security domain separation gates configured:
          to receive first data from the first security domain and transmit the first data to the second security domain if the first data complies, during operation, with a first set of rules, and
          to receive second data from the second security domain and transmit the second data to the first security domain if the second data complies, during operation, with a second set of rules,
       the second set of rules requiring that information to be transmitted from the first security domain to the second security domain be free of words and phrases indicating a likelihood that the information to be transmitted contains information of the second classification level,
       the only communication paths between the first security domain and the second security domain being through the one or more security domain separation gates,
    the method comprising:

receiving, by a security domain separation gate of the one or more security domain separation gates, data from the first security domain for transmission to the second security domain, applying a first set of rules to the data, and transmitting the data to the second security domain when the data comply with the rules.

11. The method of claim 10, wherein the first classification level is a higher classification level than the second classification level, and wherein the first set of rules prohibits the transmission of data.

12. The method of claim 10, wherein the second classification level is a higher classification level than the first classification level, and wherein the first set of rules allows unrestricted transmission of data.

13. The method of claim 10, wherein the second classification level is a higher classification level than the first classification level, and wherein the first set of rules allows transmission only of data structured in messages and complying with a format specified in a message dictionary.

14. The method of claim 10, wherein the first classification level is a higher classification level than the second classification level, and wherein the first set of rules allows transmission of data only when:

information to be transmitted from the first security domain to the second security domain is free of suspect words and phrases stored in a rules file.

* * * * *

UNITED STATES PATENT AND TRADEMARK OFFICE
CERTIFICATE OF CORRECTION

PATENT NO. : 9,971,910 B2  
APPLICATION NO. : 14/603215  
DATED : May 15, 2018  
INVENTOR(S) : Matthew T. Kling et al.

Page 1 of 1

It is certified that error appears in the above-identified patent and that said Letters Patent is hereby corrected as shown below:

In the Claims

Column 9, Line 54, Claim 1    Delete "first security domain"  
Insert -- second security domain --

Column 9, Line 55, Claim 1    Delete "second security domain"  
Insert -- first security domain --

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*